M. R. HUTCHISON.

STAPLING DEVICE.

APPLICATION FILED FEB. 14, 1918.

Reissued Aug. 20, 1918.

14,507

4 SHEETS—SHEET 1.

Miller Reese Hutchison, Inventor

By his Attorney

M. R. HUTCHISON.

STAPLING DEVICE.

APPLICATION FILED FEB. 14, 1918.

Reissued Aug. 20, 1918.

14,507

4 SHEETS—SHEET 2.

Miller Reese Hutchison, Inventor

By his Attorney

Clifford E. Dunn

M. R. HUTCHISON.
STAPLING DEVICE.
APPLICATION FILED FEB. 14, 1918.
Reissued Aug. 20, 1918.
14,507.
4 SHEETS—SHEET 3.
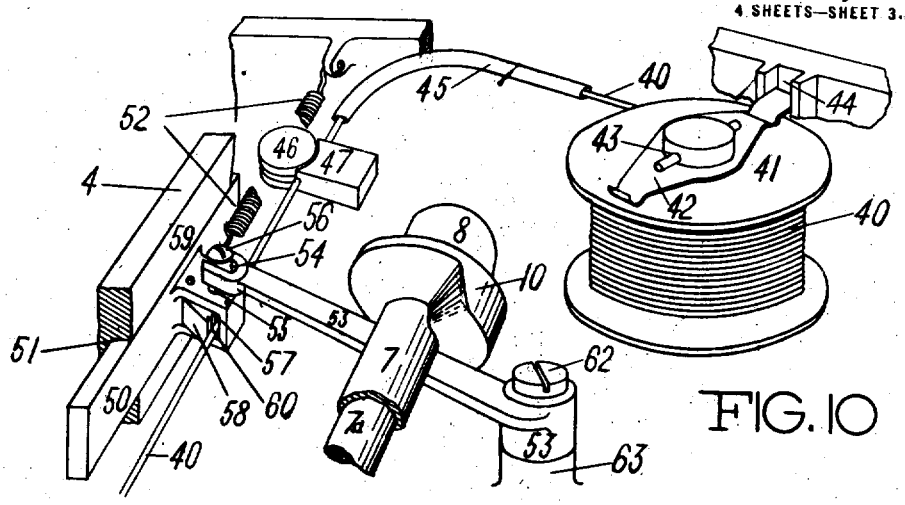
FIG. 10
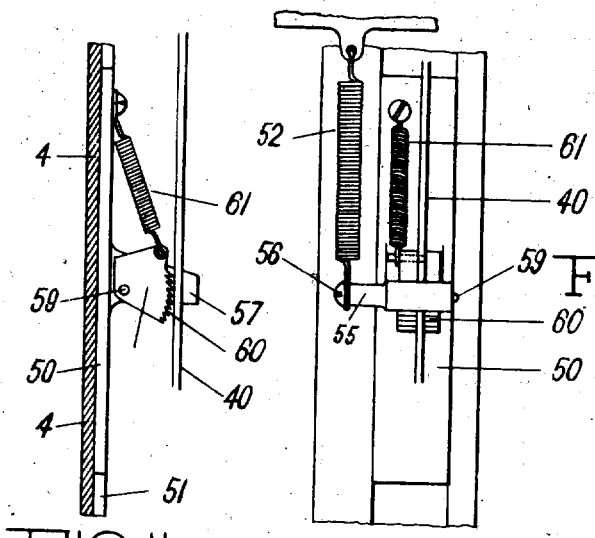
FIG. 11
FIG. 12
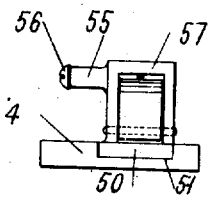
FIG. 13
Miller Reese Hutchison, Inventor
By his Attorney
Clifford E. Dunn

M. R. HUTCHISON.
STAPLING DEVICE.
APPLICATION FILED FEB. 14, 1918.

Reissued Aug. 20, 1918.

14,507.
4 SHEETS—SHEET 4.

Miller Reese Hutchison, Inventor
By his Attorney
Clifford E. Dunn

UNITED STATES PATENT OFFICE.

MILLER REESE HUTCHISON, OF WEST ORANGE, NEW JERSEY.

STAPLING DEVICE.

14,507. Specification of Reissued Letters Patent. Reissued Aug. 20, 1918.

Original No. 1,235,140, dated July 31, 1917, Serial No. 450,058, filed August 24, 1908. Renewed March 26, 1917, Serial No. 157,590. Application for reissue filed February 14, 1918. Serial No. 217,235.

*To all whom it may concern:*

Be it known that I, MILLER REESE HUTCHISON, a citizen of the United States, and a resident of West Orange, in the county of Essex and State of New Jersey, have invented certain new and useful Improvements in Stapling Devices, of which the following is a specification.

My present invention relates to machines of the type in which the staple is formed, driven, and clinched in one operation, the various instrumentalities necessary for the purpose being preferably combined in a compact unitary device operated by an externally projecting lever.

The staple is of the type comprising a body portion adapted to engage one surface of the article to be stapled, a second portion extending through the article, and a third portion bent in opposition to said first-mentioned portion, preferably so as to effect a clamping action upon the material and preferably so that the free end is bent toward the material, thereby clamping such material more tightly at the free end of the staple than at the bent portion thereof. Preferably, the staple has the form of an inverted U, the two free ends to be clinched against the back side of the material being preferably of an aggregate length not greater than the length of the straight body portion which engages the front side of the material.

One object of the invention has been to produce a bending and clinching mechanism whereby the free ends of the staple, when clinched, approach each other at a reëntrant angle, so that the clamping action is greater at said free ends than at the bends.

Another object of my invention is to drive the staple through the material and progressively deflect and bend the free ends of the staple as they emerge at the back side of the material.

Another object of my invention is to provide a guide for the legs of the staple extending as nearly as possible down to the surface of the material into which the staple is driven.

Another object of my invention is to provide a groove in the driving member for engaging the body portion of the staple to assist in maintaining alinement thereof, particularly, while being forced to final clinching position.

Another object of my invention is to arrange the deflecting grooves in the clinching anvil parallel with said groove in the driving member, to coöperate with and assist the latter in maintaining alinement during the time of application of the final clinching pressure.

Another object of my invention is to combine the staple driving mechanism with a staple forming mechanism in such manner that one member of the staple forming mechanism engages and holds the staple and is then given a movement of translation from the staple forming position into coöperative relation with the staple driving mechanism. Preferably said staple forming member is provided with parallel grooves engaging the legs of the staple when formed, and these grooves, containing the staple, are transferred to the driving mechanism and form the staple guides of the driving mechanism during the driving operation.

Another object of my invention is to provide a parallel sided anvil formed with an open ended slot and, coöperating therewith, a bifurcated bending member provided with opposite grooves adapted to engage, bend, and hold the staple when moved transversely of the open-ended slot in the anvil and to carry said staple out of the open-ended slot free of the anvil and in to the above described guiding relation to the driving mechanism.

Another object of my invention has been to provide a reel for holding and supplying wire and automatic mechanism for feeding the wire to the spool forming mechanism.

A more specific object of my invention has been to combine the above instrumentalities with a single unitary actuating means, which is moved in one direction, preferably less than a semicircumference, to complete the operations of said mechanisms and which restores said mechanisms to the initial position by a simple reverse movement of said actuating means. The actuating means is preferably a shaft provided with projections relatively arranged circumferentially and radially so as to actuate said mechanisms successively at the desired times, and to hold them in the desired stationary position at other times.

Having thus described some of the important features and objects of my invention, I will proceed to describe in detail a desirable embodiment of my invention, wherein the instrumentalities above described are combined in a unitary device of small size inclosed in a suitable case. This embodiment of my invention is shown in the accompanying drawings, in which—

Fig. 10 is a perspective view of the reel and feed for supplying the wire or other material used for the staples.

Figs. 11, 12 and 13 are details of the feeding device shown in Fig. 10; and

Figure 2:
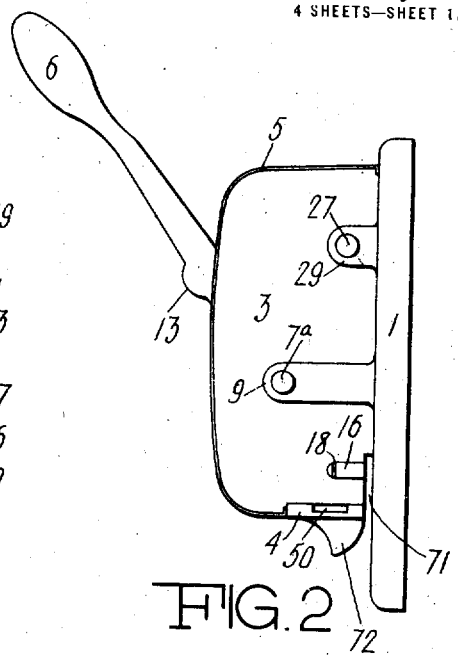
Figs. 2 and 3 are respectively side and front elevations.
Figure 3:
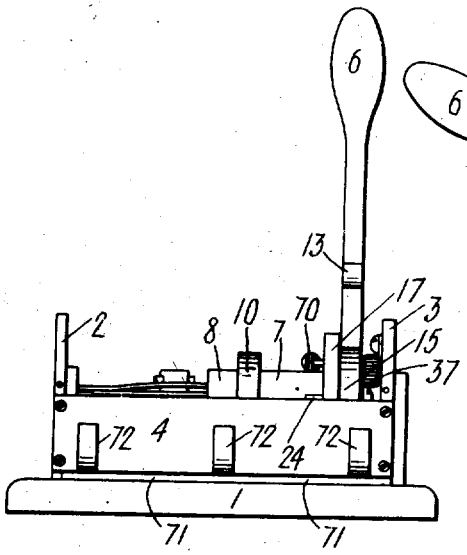

The case comprises a base 1, sides 2, 3 and front 4. The top and rear of the case are closed in by the cover indicated at 5, Fig. 2. Within this case are contained the wire holding and feeding mechanism, staple forming mechanism, and the staple driving and clinching mechanism, all coördinated and arranged to perform their various functions at the proper times. The various mechanisms are actuated by suitable power applying means, such as the hand lever 6, secured to cam sleeve 7 journaled on shaft 7ª, mounted in bearings 8, 9 and provided with cams 10, 11 and 12. As shown, the cam 12 is formed integrally with the lever 6, as is also the thrust surface 13.

These various operating surfaces 10, 11, 12 and 13 have suitably varied circumferential extent and radial projection, so that each operates its proper portion of the mechanism in its own proper time.

Figure 1:
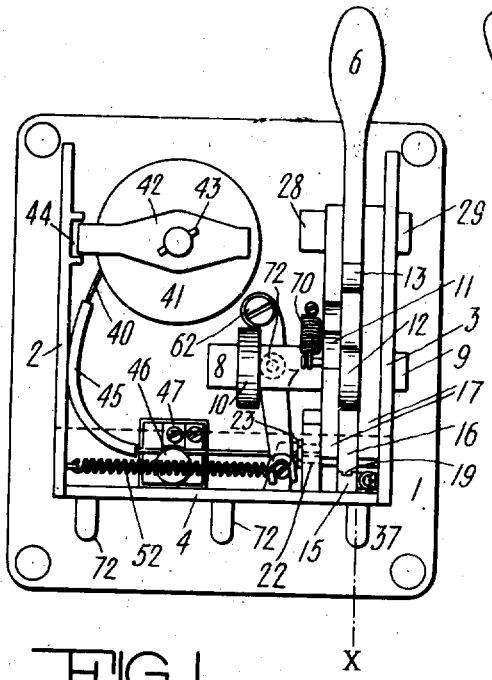
Figure 1 is a top plan view of the device with the top of the case removed.

In the form shown in the drawings, the staple driving and clinching mechanism is combined with a staple forming and feeding mechanism, and this, in turn, is provided with a blank supplying or feeding mechanism. The staple forming, driving, and clinching members comprise a clinching anvil 14, driver 15, staple forming anvil 16, and staple former 17. The staple former 17 cuts off and bends the wire or other blank to form the staple and simultaneously engages and grips the legs of the staple. It then moves forward into coöperative relation with the driver 15 and clinching anvil 14, serving as a guide for the legs of the staple during the driving operation. The parts are adapted for such combined operation by their peculiar construction and relative arrangement. The staple forming anvil 16 consists of a parallel sided block having an open ended slot 18, the bottom of the slot serving as the forming surface for the central body portion of the staple and the parallel sides serving as the anvil surfaces for formation of the legs of the staple. The forward edge of the anvil 16, into which the slot 18 opens, is provided with a guide-way 19 for the staple driver 15, so that when the staple is moved out of the slot 18, it passes directly under the driver. The staple forming and transferring member which coöperates with the staple forming anvil, consists essentially of parallel surfaces 20, 20, adapted to move transversely of the slot 18, to bend the legs of the staple, and then longitudinally of said slot to bring the staple under the driver. The surfaces 20, 20 are provided each with a groove 21 extending in a direction transverse to the direction of the open ended slot 18 of the staple forming anvil 16. The open, lower end of the groove 21 corresponds accurately with the location of the blank when fed laterally across the anvil through the passage 22 shown in dotted lines Fig. 1. Said passage is preferably formed in a bushing 23, formed of hardened steel and inset or screw threaded in the support 24. The forward face of this bushing is ground off flat and the rear face of the former 17 coöperates with the passage in the bushing to form a shear to cut off the blank.

The forming members 17, 17, are preferably maintained in parallelism by forming them as substantially rigid projections or bifurcations of a solid body or block 25. This block is mounted to permit downward and forward movement of the members 17, 17, by any suitable means, as, for instance, by a slot 26 in the rear and engaging a pivot 27, mounted in bearings 28, 29. A powerful spring 30, anchored at 31, fulcrumed at 32, and bearing upon the block 25 at 33, serves to maintain 25 normally in the upward position. In order to insure positive timing of the downward and forward movements of 25, the surface 34 for engagement with cam 12 and the correlative cam surfaces 35, 36 for engagement with cam 11, are all made integral with said block 25.

Figure 8:
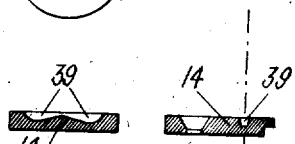
Figure 5:
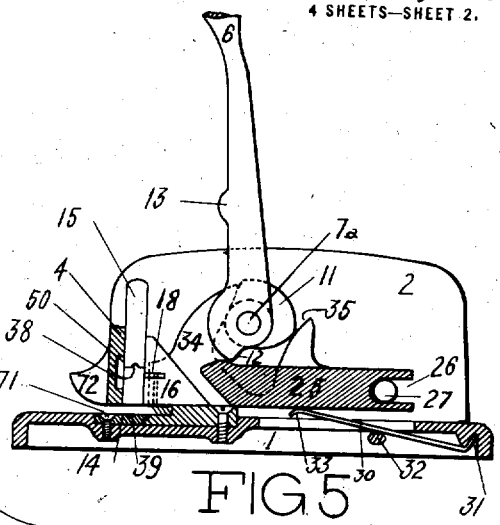
Figs. 5, 6 and 7 are similar vertical sections showing the moving parts in the successive positions to which they are moved in forming and applying the staple.

The staple driver 15 is normally held in retracted position by means of spring 37. The driver face thereof is provided with a transverse groove 38 for engagement with the head of the staple to assist in maintaining the latter in a vertical plane during the driving operation. The clinching anvil is provided with a corresponding groove 39 in the same plane. This groove 39 is deepest at the ends, as shown in Fig. 8, where the legs of the staple first engage the clinching anvil when forced downwardly by the driver 15. From the ends, it curves progressively, so that it is shallower toward the center, thereby operating to guide the legs of the staple from their initial vertical direction, laterally, toward each other, and finally upward so that they approach each other at a reëntrant angle, thereby forming a smooth bend for the staple, which does not weaken the material at the bend, but does force the free ends of the staple inward, so that when finally positioned, the staple clamps the material more tightly at the center than at the bends. This is especially important because the free ends are thus bent toward the material and are thus less likely to catch other papers or objects when in use.

The blanks may be fed through the passage 22 and across the anvil 16, by any desired feed mechanism, but I prefer to use automatically acting mechanism, such as is shown in the drawing, wherein a quantity of wire 40, is stored on a spool or reel 41, mounted on a pivot secured to the base 1. The reel is held in position and prevented from overrunning by a friction spring 42 bearing on the top of the spool and held in engagement therewith by a pin 43. The spring 42 is itself held from rotation by arranging the free end thereof to project into engagement with the side of the case 2, as at 44. A wire or other blank 40, passes from the reel through the curved guide 45, secured to the wall of the case 2, preferably by brazing. Thence, the wire passes through a straightening device and an automatic gripping and feeding mechanism. The wire straightening device consists of a convex surface on block 46 and a concaved surface on block 47, adapted to bend the wire beyond its limit of elasticity. The coöperating surfaces of 46 and 47 are preferably grooved so as to prevent displacement of the wire. The feeding mechanism comprises a slide 50, adapted to reciprocate in slot 51 in the front 4 of the case. The slide 50 is held in the retracted position under tension of spring 52, and is moved against the tension of said spring by a lever 53, forked or slotted at the free end 54 to engage pin or projection 55 on 50. The gripping device consists of a stationary clamping member 57 and a coöperating pivoted pawl 58 tending toward said surface by reason of tension of spring 61. As shown, the stationary clamping member is formed as a U-shaped projection from the reciprocating member 50, the pivot 59 for the pawl 58 being supported in the sides thereof. The pawl is provided with teeth 60 for engaging the wire 40 and the toothed surface is pivoted slightly off center, so that the pawl normally grips the wire on the forward movement and slides over it on the rearward movement. The lever 53 for actuating the sliding member 50 in the forward direction is pivoted upon a screw 62 mounted in a boss 63, which is preferably solid with base 1.

The operation of the device is as follows: The handle 6 is initially in the rearward position, indicated by the dotted line A, Fig. 14. This corresponds to the position shown in Figs. 1 and 2, and the hand lever 6 is preferably normally forced back to this position by means of a powerful coiled spring 70.

Figure 4:
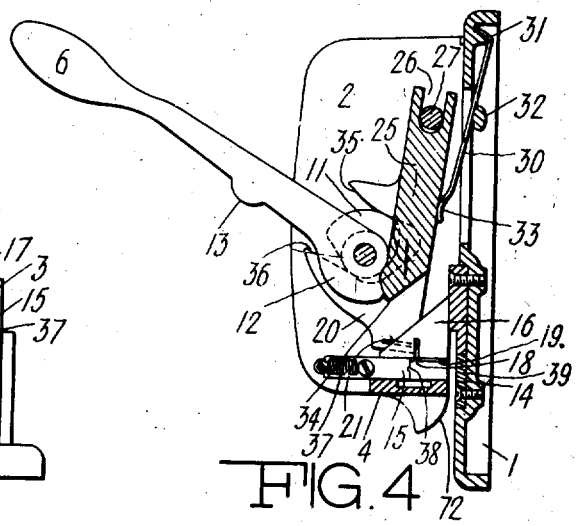
Fig. 4 is a vertical section through the case on the line X, certain of the moving parts being shown in side elevation.

The sheets of paper or other material to be stapled are inserted in the slot 71, under the guides 72, with the particular point to be stapled located directly over the anvil 14. The various operations are then performed successively by forward movement of the hand lever 6. The first movement of the handle from the position indicated by dotted line A, Fig. 14, to that indicated by dotted line B, brings the parts to the position indicated in Fig. 4 of the drawings. During motion through this portion of the arc, the face projection on cam 10 engages the lever 53, preferably through the medium of the antifriction roller 72. As shown more clearly in Fig. 10, this forces the free end of said lever 53 in the direction of the staple forming mechanism, the pawl 58 gripping the wire 40 so that the free end of the wire is fed across through the slot 18 in the staple forming anvil 16, as indicated in the various figures. At the same time, an equal length of wire is thereby drawn from the reel 41 and dragged through the wire straightener 46, 47. At this time, cams 11 and 12 engage the cam surface on block 25 along concentric portions of said cams 11 and 12, so that said block remains stationary in the uppermost position, shown in Fig. 4, being held there by leaf spring 30.

Figure 14:
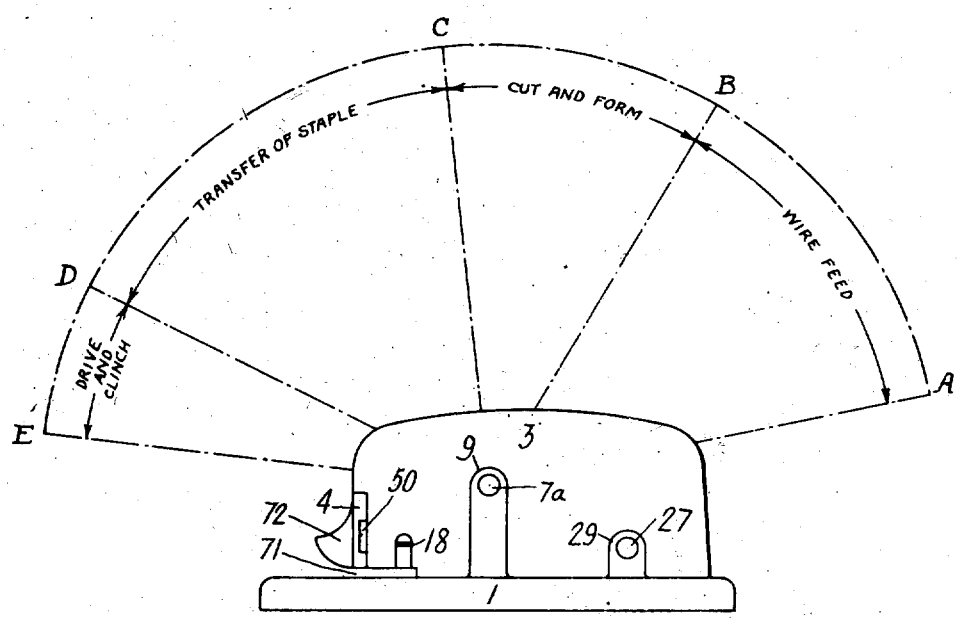
Fig. 14 is a side elevation of the device with the successive positions of the actuating lever diagrammatically indicated.

A further movement of the hand lever 6 to position indicated by dotted line C, Fig. 14, serves to cut off and form the length of wire which has been fed across the anvil 16. The projecting portion of cam 12 engaging with 34, causes a sharp downward movement of the staple forming members 17, 17. In its downward movement, the outer edge of one of the members 17, shears the wire where it projects from the face of the tool steel bushing 22. The open end of the grooves 21 register exactly with the wire thus cut off, and further downward movement operates to bend the wire against the parallel sides of the anvil 16 to form the legs of the staple. The grooves 21 being straight and being moved on the arc of a circle, might tend to have some shearing action on the staple wire were it not that the latter is free to slide along the upper surface of the anvil; thereby accommodating itself to and permitting whatever play is necessary to compensate for the difference between the arc or curve on which the groove 21 moves and the straight line or tangent along which it is formed.

Figure 6:
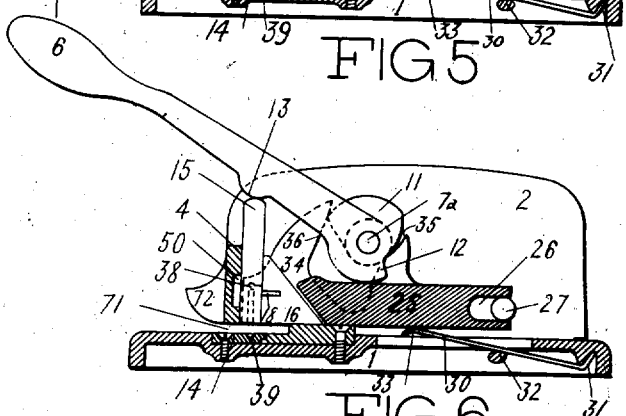
Figure 7:
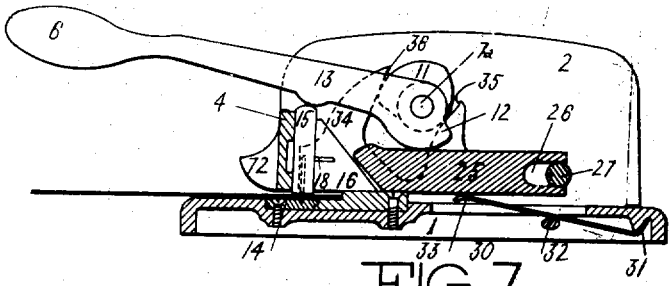

A further movement of the hand lever to the position shown by the dotted line D, serves to bring the cam 11 into contact with cam surface 36, thereby forcing the staple forming member carrying the staple held in grooves 21, under the staple driving member 15, into the position shown in Fig. 6. It will be noted that during this part of the movement, the bearing surface of the cam 12 is concentric with the axis, so that the block 25 and its bifurcations 17, 17, are securely held in the depressed position.

When the parts have reached the position shown in Fig. 6, the cam 11 has rotated far enough so that the portion of the surface which is then bearing on 36, is concentric with the axis, so that for the remaining portion of the forward movement of the handle 6, the staple is securely held in position, the grooves 21 serving as guides for the legs of the staple during the driving and clinching operation. A further movement of the hand lever 6, to the position shown by dotted line E, causes the projection 13 to come in contact with the head of the driver 15, which is forced downwardly, the groove 38 engaging the body portion or head of the staple. A further downward movement forces the staple downwardly along grooves 21, which serve as guides to support the staple against distortion during the driving and clinching operations. The legs are forced through the material and engage the respective ends of the groove 39. Continued downward movement of the plunger then operates to progressively bend the ends of the legs of the staple toward each other. At this point, the staple is securely held and prevented from movement out of the driving plane by the groove 38 on the driver, the side grooves 21 in the former, and the bottom groove 39 in the clinching anvil.

Figure 9:
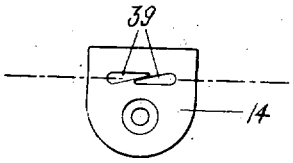
Figs. 8 and 9 are detail views of the clinching anvil.

The groove 39 is preferably formed shallower at the center than at the ends, so that when clinched the free ends of the staple approach each other at a reëntrant angle clamping the material more firmly at the free ends than at the bends, the ends of the grooves 39 being deep enough so that the bends cannot be made too sharp. As is seen by reference to Fig. 9, the clinching groove 39 is preferably in the form of two oppositely extending grooves formed in such a manner that their inner ends are out of alinement and overlap; such a construction permits of increased length of the clinched end portions of the staple and secures a clinching effect of maximum strength and efficiency.

When the forward movement of the hand lever 6 has been completed and the staple formed, transferred, driven, and clinched, as above described, the handle is moved back to the initial position, either by the operator or automatically by action of spring 70. This operates to restore all parts to the initial position, ready for the next stapling operation.

While I have herein fully shown and described, and have pointed out in the appended claims certain novel features of construction, arrangement and operation which characterize my invention, it will be understood by those skilled in the art that various omissions, substitutions and changes in the forms, proportions, sizes, and details of the device and of its operation, may be made without departing from the spirit of my invention.

It will be obvious that where it is desirable to apply several staples simultaneously or affixed distances from each other, a plurality of stapling devices may be employed and that if desired, these may all be operated from the same cam shaft.

Having thus described my invention what I claim as new and desire to secure by Letters Patent of the United States, is:—

1. In a stapling machine, a wire supplying mechanism, a staple cutting and forming mechanism having a rocking reciprocatory movement and a staple driving mechanism having a rectilinear reciprocating movement, in combination with a single rock shaft provided with means for effecting complete actuation of said mechanisms by a single movement in one direction of said shaft.

2. In a stapling machine, a wire-supplying mechanism, staple-cutting and forming mechanism having a rocking reciprocatory movement to cut and form the staple and a rectilinear reciprocatory movement to transfer the staple to driving position, and mechanism for driving the staple in said position, in combination with a single rock-shaft provided with means for effecting complete actuation of said mechanisms by a single movement in one direction of said shaft.

3. In a stapling machine, a wire-supplying mechanism, a combined staple cutting and forming mechanism, and staple guiding and driving mechanism, in combination with a single rock shaft provided with means for effecting complete actuation of said mechanisms by a single movement in one direction of said shaft, and cam means having eccentric portions arranged in permanent contact with said forming mechanism so that the shaft moves the forming mechanism and at intervals holds said mechanism stationary, said staple driving mechanism being operatively connected with said shaft only when in actual operation.

4. In a stapling machine, a wire-supplying mechanism, a combined staple cutting and forming mechanism, and staple guiding and driving mechanism, in combination with a single rock shaft provided with means for effecting complete actuation of said mechanisms by a single movement in one direction of said shaft, cam means having eccentric portions arranged in permanent contact with said forming mechanism so that the shaft moves the forming mechanism and at intervals holds said mechanism stationary, said staple driving mechanism being operatively connected with said shaft only when in actual operation, and means independent of the staple forming means for returning said staple driving mechanism to normal position after each operation of the same.

5. In a stapling machine, a wire supplying mechanism, staple cutting and forming mechanism, a stationary anvil or forming block coöperating with said forming mechanism, a staple guiding and driving mechanism, in combination with a single rock shaft provided with means for effecting complete actuation of said mechanisms in the order named to cut, form and drive a staple by a single movement in one direction of said shaft.

6. In a stapling machine, a wire supplying mechanism, staple cutting and forming mechanism, a stationary anvil or forming block coöperating with said forming mechanism, staple driving mechanism and mechanism for shifting the staple from the forming to the driving position, in combination with a single rock shaft provided with means for effecting complete actuation of said mechanisms by a single movement in one direction of said shaft.

7. In a stapling machine, a wire supplying mechanism, staple cutting and forming mechanisms, staple driving mechanism, and means for shifting the forming mechanism to cause the same to convey the formed staple to the driving mechanism, said forming mechanism having a rocking movement around a pivot in forming the staple and having a shifting movement on its pivot to transfer the staple to the driving mechanism, in combination with a single rock shaft provided with means for effecting complete actuation of said mechanisms by a single movement in one direction of said shaft.

8. In a stapling machine, a wire feed mechanism, a stationary staple forming block and a staple driver, in combination with a staple former slidably pivoted in the frame of the machine, and means for giving said staple former a rocking reciprocatory movement to form the staple over said stationary forming block and a rectilinear reciprocatory movement to place the staple beneath the staple driver.

9. In apparatus of the character described, the combination with staple forming means and staple setting means, of a single operating member to effect the functioning of said means, a cam on said member to actuate said forming means and maintain it stationary in actuated position, and an additional cam on said member for operating said setting means.

10. In apparatus of the character described, the combination of a wire-feeding means, staple forming means and staple setting means, a shaft, a cam on said shaft for operating said wire-feeding means, a cam lever mounted upon said shaft, the cam thereof being adapted to effect the functioning of said staple forming means, and a projection extending from said lever for operating the staple setting means.

11. In apparatus of the character described, the combination of wire-feeding means, staple forming means and staple setting means, a shaft, a cam on said shaft, for operating said wire-feeding means, a lever mounted upon said shaft, a cam integral with said lever and provided with an inactive surface which first becomes effective to permit said first-mentioned cam to function upon the movement of said lever, said inactive surface on said cam member being followed by an active surface for effecting the operation of said staple forming means, and said active surface being followed by a second inactive surface for retaining said forming means in a given position during the operation of said staple setting means.

12. In apparatus of the class described, the combination of means for holding a section of staple forming wire, a forming head, a staple setting member, an operating lever, a cam forming a part of said lever for moving the forming head into position to form the staple and to maintain the head in position to hold the staple for setting, and a cam integral with said lever for actuating the said member to set the staple.

13. In apparatus of the character described, a base having an upright portion, a wire-containing spool, mounted on said base, a tensioning spring engaging the end of said spool, and means on said upright portion engaging the end of said spring to prevent the latter from rotating with the said spool.

14. In apparatus of the class described, the combination with stapling mechanism, of an operating handle therefor, a casing inclosing said stapling mechanism and including integral base and end members and a removable cover, said cover having an opening therein to accommodate the said operating handle, whereby the cover may be removed independently of the operating handle, and a pocket in the base of said casing to receive articles to be stapled.

15. In apparatus of the character described, a casing having an end wall, a wire-containing spool mounted adjacent said wall, a tensioning spring engaging the end of said spool and having one of its ends extending beyond the edge of the spool head, and ribs formed on the end wall adapted to accommodate the projecting end of said spring, whereby the latter is prevented from rotating with said spool.

16. In a stapling machine, a wire-supplying mechanism, a staple cutting and forming mechanism having a rocking reciprocatory movement in combination with a single shaft provided with means for effecting complete actuation of said mechanisms by a single movement in one direction of said shaft.

17. In stapling mechanism, the combination of wire-feeding and cutting mechanisms, staple forming and staple setting mechanisms, an operating lever for actuating said mechanisms by a continuous movement in one direction, and means for automatically returning the wire feeding, staple forming, and staple setting mechanisms to initial position.

18. In stapling mechanism, the combination of wire-feeding and cutting mechanisms, staple forming and staple setting mechanisms, an operating lever for actuating said mechanisms by a continuous movement in one direction, means for automatically returning the wire-feeding, staple forming and staple setting mechanisms to initial position, and means for limiting the movement of the staple forming mechanism into initial position.

19. An apparatus of the class described, the combination with staple forming means and staple setting means, of a single operating member to effect the functioning of said means, a cam on said member to actuate the said forming means and maintain it in actuated position, and an additional cam on said member for operating said setting means.

20. In apparatus of the character described, the combination of a wire feeding means, staple forming means and staple setting means, a shaft, a cam on said shaft for operating said wire-feeding means, a cam lever mounted upon said shaft, the cam thereof being adapted to effect the functioning of said staple forming means, and a projection extending from said lever for operating the staple setting means.

21. In apparatus of the class described, the combination of means for holding a section of staple forming wire, a forming head, a staple setting member, an operating lever, a cam forming a part of said lever for moving the forming head into position to form the staple and to maintain the head in position to hold the staple for setting, and a cam integral with said lever for actuating the said staple setting member to set the staple.

MILLER REESE HUTCHISON.